No. 814,054. PATENTED MAR. 6, 1906.
G. B. LAMB.
PRESS.
APPLICATION FILED JUNE 7, 1905.

6 SHEETS—SHEET 3.

Witnesses
Inventor
George B Lamb
by George W Hey
Attorney

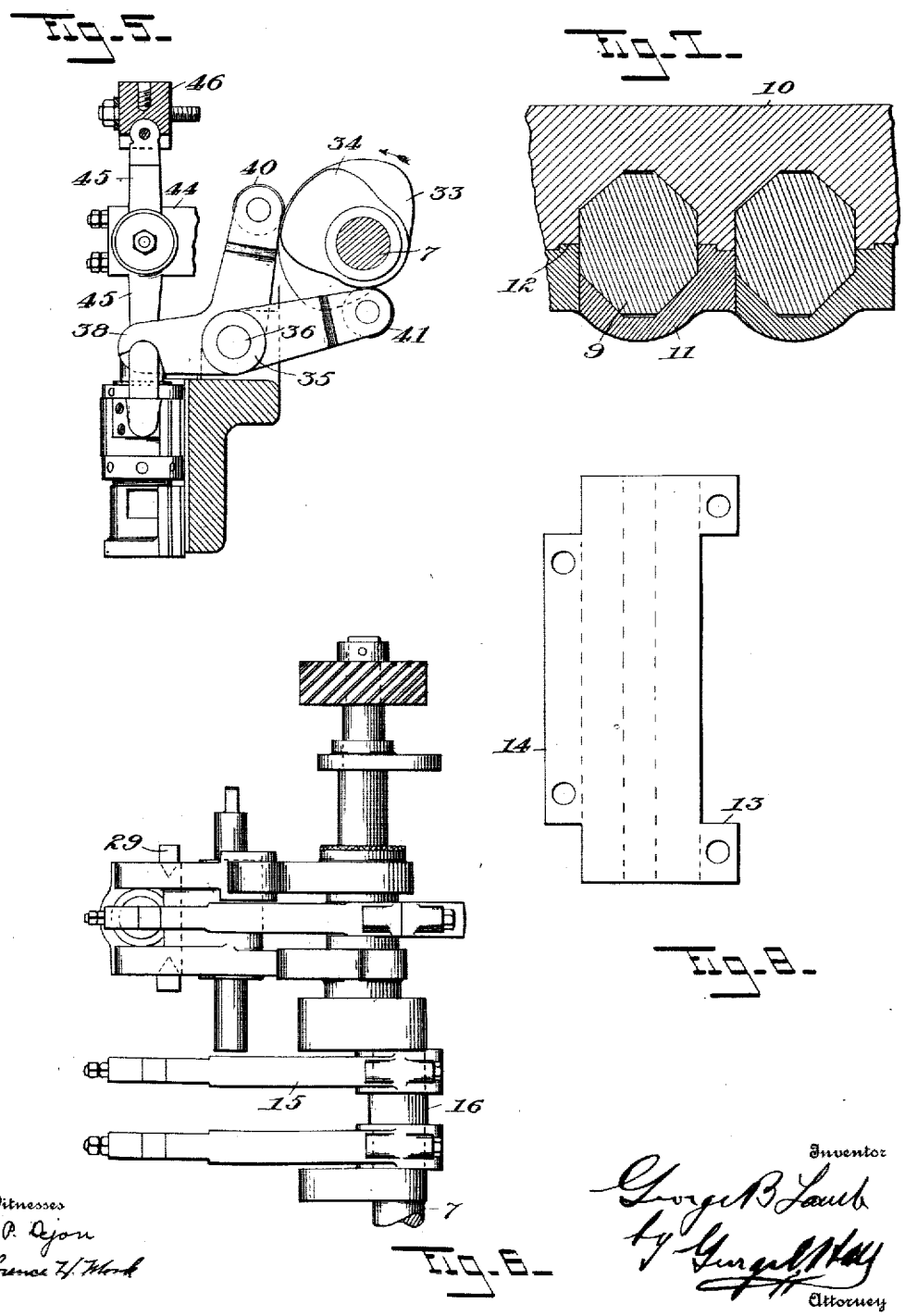

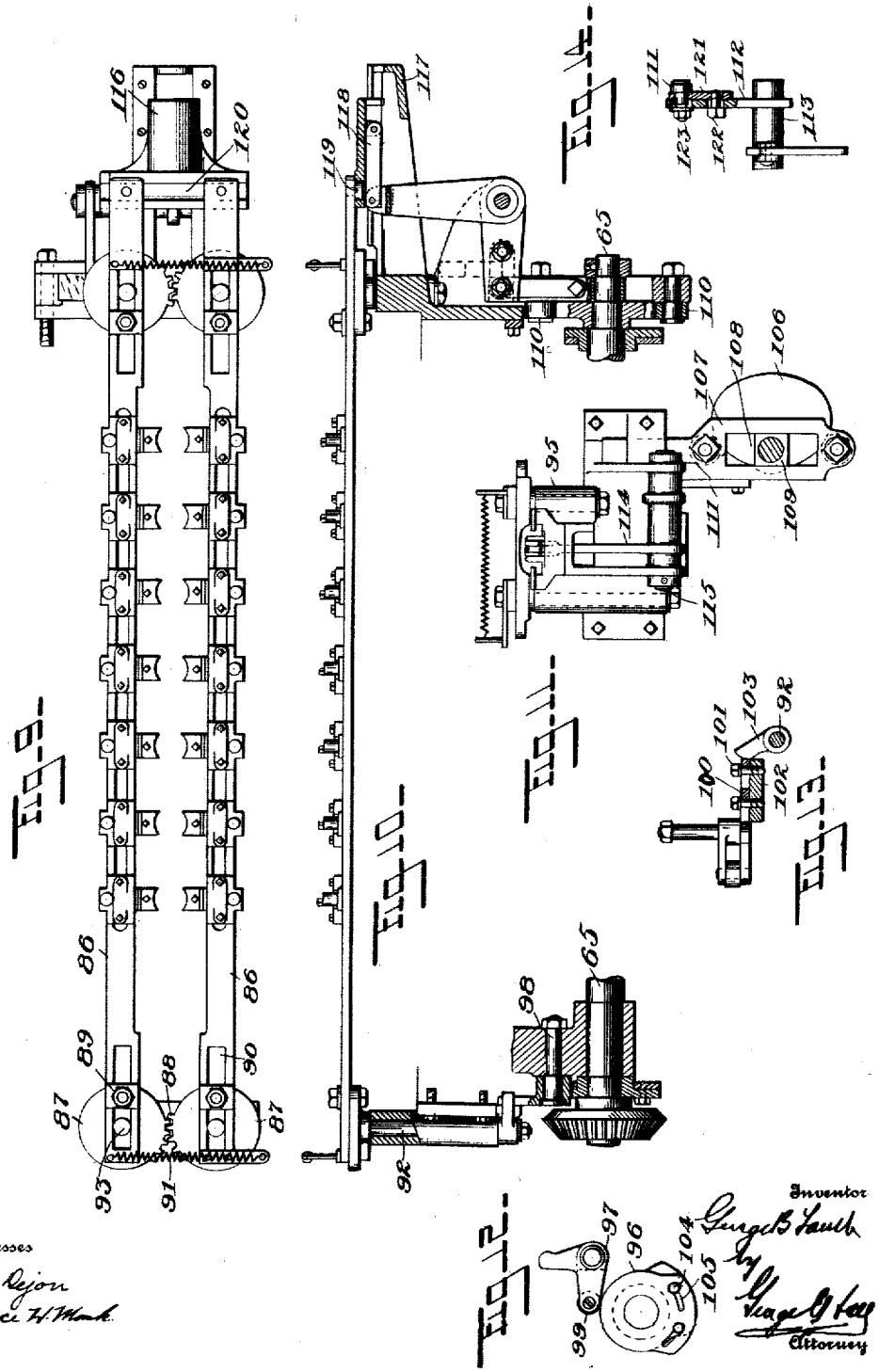

No. 814,054. PATENTED MAR. 6, 1906.
G. B. LAMB.
PRESS.
APPLICATION FILED JUNE 7, 1905.

6 SHEETS—SHEET 6.

Witnesses
J. P. Dejon
Florence H. Monk

Inventor
George B. Lamb
by George W. Well
Attorney

UNITED STATES PATENT OFFICE.

GEORGE B. LAMB, OF WATERBURY, CONNECTICUT, ASSIGNOR TO THE WATERBURY FARREL FOUNDRY AND MACHINERY COMPANY, OF WATERBURY, CONNECTICUT, A CORPORATION OF CONNECTICUT.

PRESS.

No. 814,054.     Specification of Letters Patent.     Patented March 6, 1906.

Application filed June 7, 1905. Serial No. 264,197.

*To all whom it may concern:*

Be it known that I, GEORGE B. LAMB, a citizen of the United States, residing at Waterbury, in the county of New Haven and State of Connecticut, have invented certain new and useful Improvements in Presses, of which the following is a specification, reference being had therein to the accompanying drawings.

My invention relates to new and useful improvements in presses, and refers more particularly to that type of press which is commonly known in the art as a "cut-and-carry" press.

It is the object of my invention, among other things, to construct a press of this character in which the double-acting mechanism will be actuated from a shaft out of the axial line of movement of said plunger, to provide and mount the several single-acting plungers whereby they may be accurately adjusted independently of each other and each of said plungers removable without interfering with the adjustment of any of the other plungers, to provide knock-out mechanism that can be positively actuated and so mounted as to be readily removed without disarranging the tools and each of the knock-out rods removed separately, if desired, to provide a simple and effective means for carrying the metal successively from one tool to another during the several operations, and in general to so design and construct the several parts of my new and improved press that it may be economically constructed and readily assembled.

Figure 1:
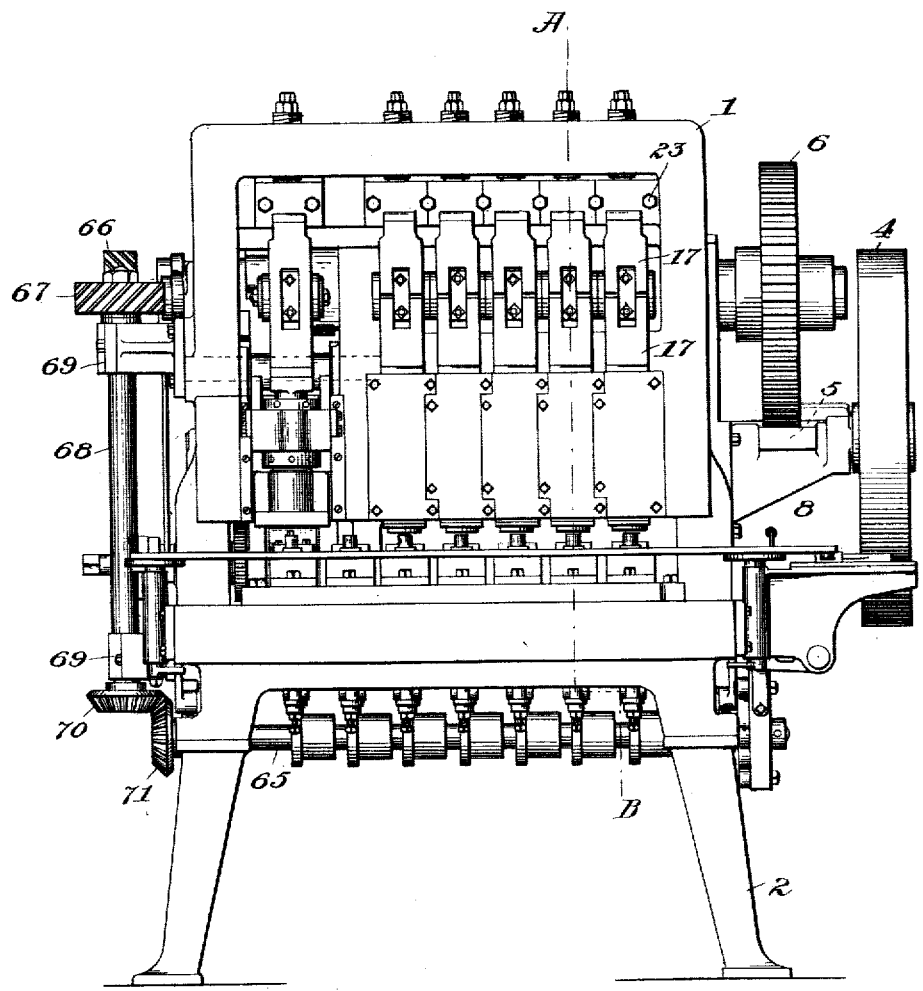
Figure 2:
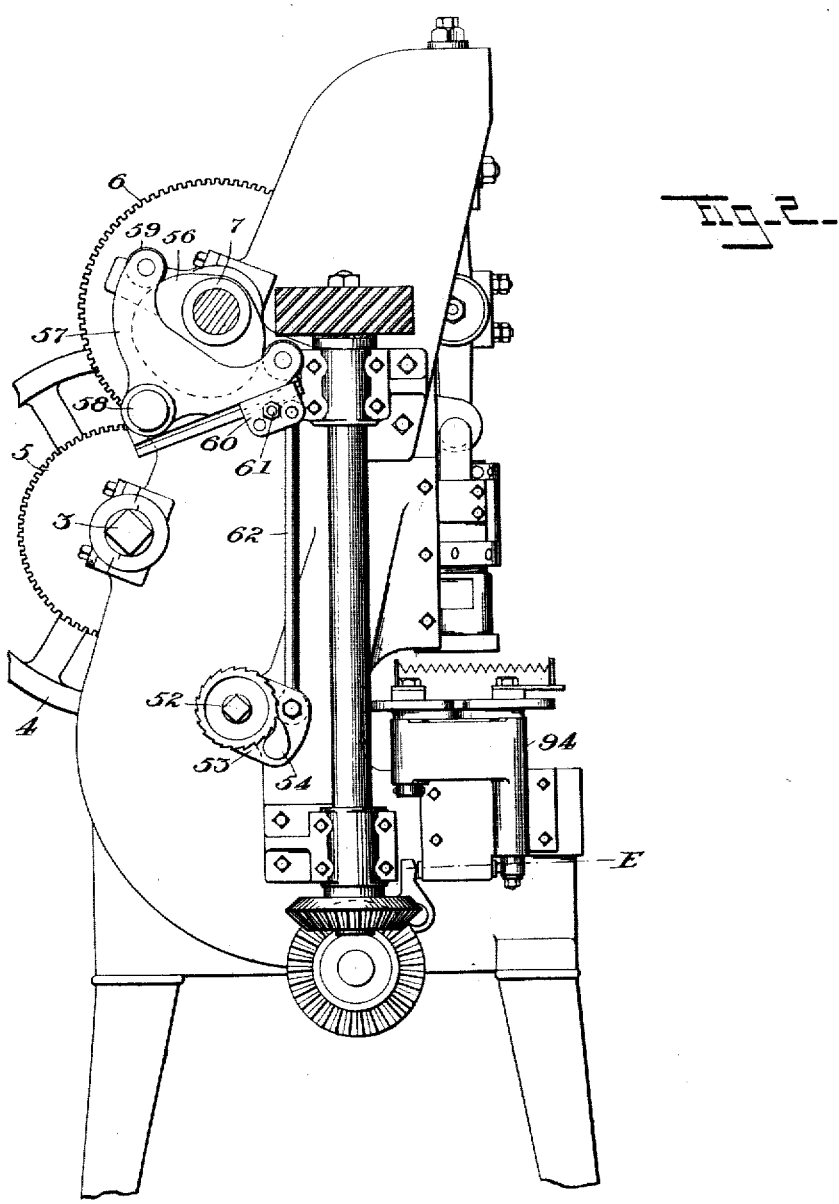
Figures 3, 4:
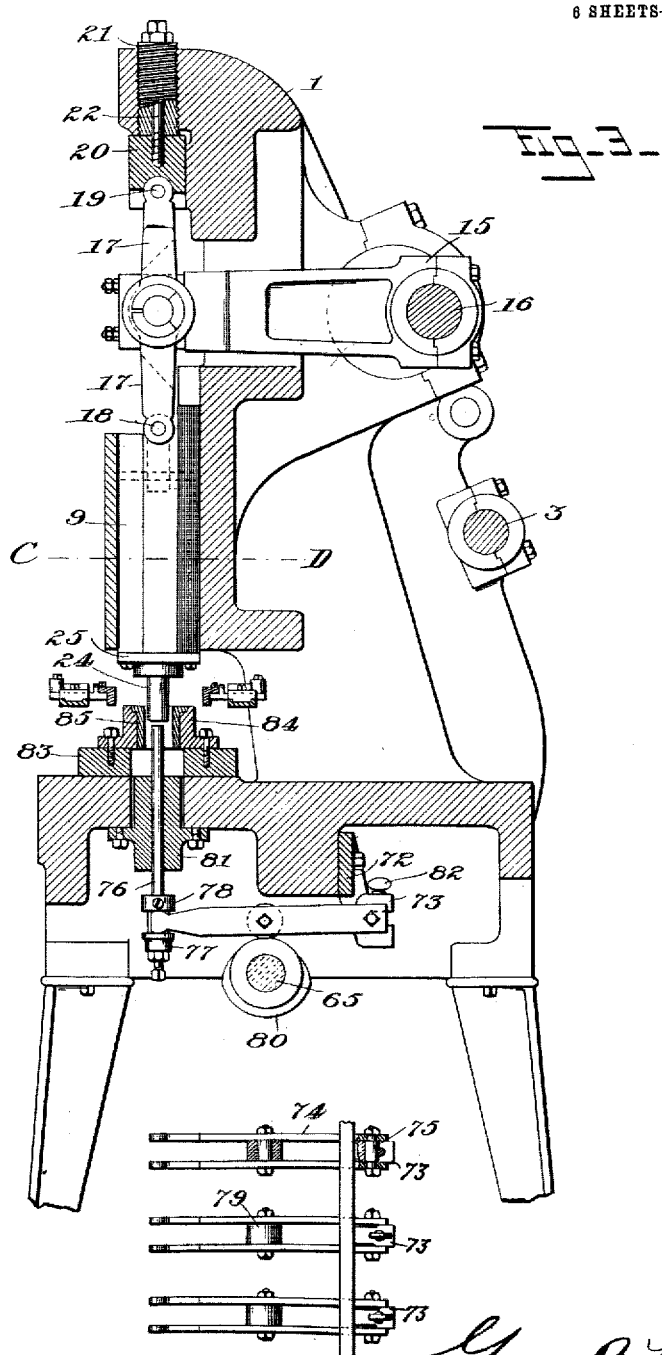
Figure 15:
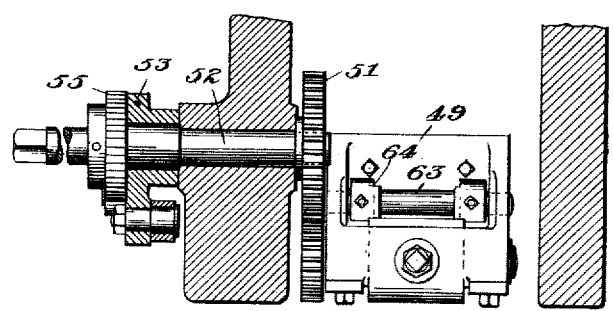
Figure 13:
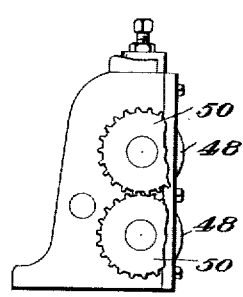
Figure 20:
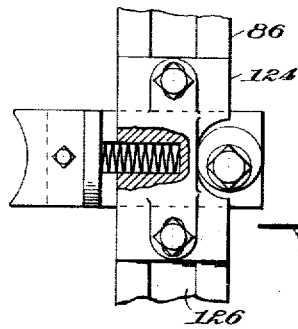
Figure 17:
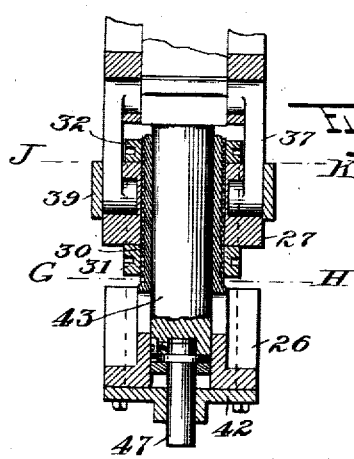
Figure 21:
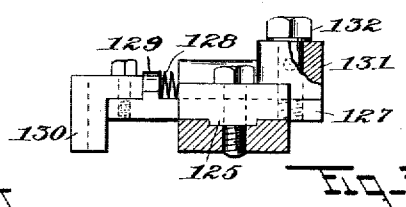
Figure 18:
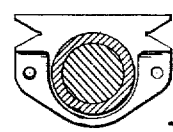
Figure 19:
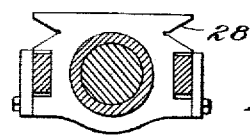

Referring to the drawings, in which like numerals of reference designate like parts in the several figures, Figure 1 is a front elevation of my new and improved press. Fig. 2 is a side elevation looking from the left of Fig. 1. Fig. 3 is a vertical section thereof upon line A B of Fig. 1. Fig. 4 is a detail plan view of a portion of the knock-out mechanism. Fig. 5 is a side elevation of a portion of the double-acting mechanism. Fig. 6 is a plan view of a portion of the crank-shaft, the double-acting gate and its operative mechanism, and some of the pitmen for the single-acting plungers. Fig. 7 is a fragmentary plan view of the single-acting plungers and adjacent parts, taken upon line C D of Fig. 3. Fig. 8 is a front elevation of the caps for the single-acting plunger. Fig. 9 is a plan view of the carrying mechanism. Fig. 10 is a front elevation thereof with some of the parts in section. Fig. 11 is an end view thereof looking from the right of Figs. 9 and 10. Fig. 12 is an elevation of the cams and bell-crank for giving the carrying mechanism an in-and-out movement. Fig. 13 is a sectional view of some portions of the carrying mechanism, taken upon line E of Fig. 2. Fig. 14 is a fragmentary plan view of the rock-sleeve. Fig. 15 is a plan view of the feed-roll mechanism with a portion of the parts shown in section. Fig. 16 is a side elevation thereof, a portion of the gears being broken away. Fig. 17 is a sectional elevation of the double-acting plunger. Fig. 18 is a sectional plan view thereof, taken upon line G H of Fig. 17. Fig. 19 is a sectional plan view thereof, taken upon line J K of Fig. 17. Fig. 20 is an enlarged plan view of the carrier-finger mechanism, and Fig. 21 is an elevation thereof.

Referring to the drawings, the numeral 1 designates the frame of the machine, which is supported upon legs or standards 2; 3, the back shaft, which is journaled in the frame and the bracket 8 affixed thereto and upon which is fixed a pulley 4 and pinion 5, which meshes into and drives a gear 6 upon the crank-shaft 7, that is journaled in the frame. A clutch mechanism actuated from a treadle is usually provided to start and stop the mechanism as desired. As any of the many forms of clutch and treadle mechanism may be used upon my improved press, I have not illustrated this mechanism in the drawings.

In the press illustrated there are five single-acting plungers 9, which are octagonal in cross-section and are vertically movable in guideways in the front of the part 10, integral with the frame and held therein by the caps 11. It will be seen from the sectional view in Fig. 7 that the plungers have no frictional engagement upon two of its sides, one of said sides being within the guideway in part 10 and the other within the cap 11, this being designed so that all wear upon the parts may be taken up and the plungers have the proper frictional engagement at all times. The caps 11 are provided with lips 12 to prevent their lateral displacement and with a recess 13 in one side thereof and a wing 14 upon the other side, the wing and recess being of the same length, so that when the caps are fastened to the part 10 the wing upon one cap will enter and be held within the recess in the cap next adjoining. The cap is thus held against lateral movement and securely fastened upon both sides of the plunger in such manner as to permit the same to be readily detached without disturbing the cap upon either side thereof. The necessary tools for performing the several operations may be fastened in or to the lower end of the plungers, as desired, and in Fig. 3 I have illustrated such tool as a drawing-punch, (designated 24,) which is held within a punch-holder 25, fixed to the bottom side of the plunger. The plungers 9 are actuated by means of the pitmen 15, which are connected at one end with the cranks 16 upon the shaft 7 and to the toggles 17 at the other end. The lower toggle is connected by the pin 18 with the plungers 9 and the upper toggle by the pin 19 to the backing-block 20, which is adjustable vertically by the screw 21, threaded through the frame 1 and impinging against said backing-block 20, and the screw 22, which passes through the screw 21 and is threaded into said backing-block. These several backing-blocks are secured in their adjusted positions by the bolts 23 in such manner as to permit the toggle mechanism of each of the single-acting plungers to be removed without disturbing any of the other toggle mechanisms.

The double-acting mechanism comprises a lower gate 26 and an upper gate 27, each of which is provided with grooves 28, into which are fitted the ways 29, that are bolted to the frame 1. Integral with the lower gate is an upwardly-projecting body portion 30, which is exteriorly threaded and passes through the gate 27, having the check-nuts 31 and 32 thereon and by which means the position of the two gates in relation to each other are adjusted and rigidly locked together. These gates are actuated vertically by means of the cams 33 and 34, which are fixed upon the crank-shaft 7; the rock-arm 35, mounted upon the shaft 36, that is fixed within the frame 1; links 37, pivotally secured at their lower ends to the gate 27 and at their upper ends to the arm 38 upon the rock-arm 35, lateral displacement of the links being prevented by the caps 39, which are bolted to the upper gate 27, and cam-rolls 40 and 41, which lie against the faces of the cams 33 and 34, respectively. Rotation of the shaft 7 and the cam 34 imparts a rocking movement to the rock-arm 35 and moves the gates 27 and 26 downwardly, and the engagement of the roll 41 with the cam 34 returns the gates to their original positions, the cams 33 and 34 being so shaped and timed as to provide for this movement. To the under side of the gate 26 is preferably secured the cutting-punch 42, which engages with a die fixed to the frame and pierces the blank from the metal strip.

Vertically movable within the lower gate 26 is the drawing-plunger 43, which is actuated in substantially the same manner as the single-acting plungers 9, there being a pitman 44, which is actuated from a crank upon the shaft 7, and toggles 45, the lower of said toggles being connected with the plunger 43 and the upper toggle with the backing-block 46, which is adjusted and secured in the manner described for the backing-blocks 20. Fixed in the lower end of this plunger 43 is a drawing-punch 47, which is held therein by any of the means common to the art. Heretofore it has been the practice to operate the double-acting mechanism of a press from a shaft directly above the axial line of movement of the parts; but this construction is objectionable and is overcome in my invention by positively operating the cutting and drawing parts from a shaft that is in the rear of their axial line of movement.

The feed mechanism comprises the rolls 48, journaled in the roll-frame 49, which is fixed to the frame 1, each of said rolls having a gear 50 fixed thereto and which mesh into each other, with the gear upon the upper roll meshing into a gear 51, which is fixed upon a shaft 52, journaled in the side of the frame 1; a pawl-plate 53, loosely mounted upon the shaft 52 and carrying a pawl 54, which engages the teeth upon the ratchet 55, fixed to the shaft 52, a cam 56, fixed upon the shaft 7; a yoke 57, that is pivotally secured to the frame 1 upon the stud 58 and carrying the rolls 59, which engage the face of the cam 56; a block 60, slidable upon the yoke 57 and secured in any of its adjusted positions by a bolt 61, and a rod 62, connecting the block 60 with the pawl-plate 53. The rotation of the cam 56 oscillates the yoke 57, and through the rods 62 the pawl 54 is actuated, and engagement of this pawl with the ratchet-disk 55 imparts a rotary movement to the shaft 52, which is communicated to the rolls 48 through the gears 51 and 50. The length of the feed can be varied by shifting the position of the block 60 upon the yoke 57, it being apparent that the closer the block is to the stud 58 the less the movement of the pawl-plate 53. The end of the shaft 52 is squared, as shown in Fig. 15, so as to permit of the manual rotation of the shaft 52 and rolls 48. Fixed within the roll-frame 49 is the guide-shaft 63, having thereon the adjustable stops 64, between which the metal strip is fed before passing between the rolls, the adjustment of these stops 64 determining the lateral position of the strip as presented beneath the cutting and drawing punches.

Beneath the frame 1 is the shaft 65, which is rotatably driven from the crank-shaft 7 by the helical gear 66 thereon, which meshes into the helical gear 67 upon the vertical shaft 68, that is rotatably mounted in the boxes 69, and the beveled gear 70, which meshes into and drives the beveled gear 71 upon the shaft 65. In Fig. 2 the helical gear 66 is not shown, but removed, so as to more clearly show the construction and operation of the feed-cam and yoke.

Bolted to the under side of the frame 1 is the bracket 72, having the laterally-projecting horizontally-slotted lugs 73 integral therewith. Upon either side of these arms are the knockout-levers 74, which are connected at their rear ends by a stud 75 of substantially the same diameter as the width of the slot in the arm 72 and having nuts upon either end thereof, as shown in Fig. 4. The other end of the knockout-arms straddle the knockout-rod 76 between the head 77 and the collar 78 thereon. Rotatably mounted between each pair of the knockout-levers 74 is the cam-roll 79, which lies upon the periphery of the knockout-cams 80, fixed to the shaft 65. The knockout-rods 76 are slidable within the fixed sleeves 81. Heretofore it has been common to actuate the knockout-rod from a shaft directly beneath the rod; but this construction is objectionable in that the rods are not accessible or mounted so as to be readily removed. In my invention I have so designed and constructed the parts that each of the knockout-rods may be assembled or taken down without disturbing any of the other other rods, it being simply necessary to remove the pin 82, which passes down through the lugs 73 and holds the stud 75 against displacement, after which the levers can be disengaged both from the lug 73 and the knockout-rod, which can then be readily removed.

Fixed upon the top of the bed is a bolster-plate 83 of any preferred construction and upon the top of which are a plurality of die-blocks 84, corresponding in number with the plungers, and in each of these die-blocks is fitted such tools as are necessary to perform the successive operations. In Fig. 3 I have shown a drawing-die 85 as fixed therein and into which the punch 24 enters during the downward movement of the plungers 9, the knockout-rods 76 being in the same axial line as the plungers 9.

The carrying mechanism comprises the two parallel bars 86 and between which the punches and dies are operative; crank-plates 87, which are provided upon their periphery with the intermeshing teeth 88; the crank-blocks 89, which are slidable within slots 90 in the bars 86; coil-springs 91 at either end of said bars and connecting the same, the normal tension of which draws the said bars together, and spindles 92 and 93, which are rotatably mounted in brackets 94 and 95, fixed to the ends of the frame 1. A rotary movement is imparted to the spindles 92 and 93 and through the crank-plates 87 an in-and-out movement to the bars 86 by the cams 96, which are fixed upon the shaft 65, bell-cranks 97, mounted upon studs 98, fixed in the frame 1 and carrying a roll 99 thereon, which lies upon the periphery of the cams 96, one arm of the said crank 97 engaging the end of a slide 100, that is movably secured by the bolts 101 to a depending lug 102 upon the brackets 94 and 95, which slide abuts at its opposite end against an arm 103, fixed to the lower end of the spindle 92. The cam 96 is constructed with two plates, as shown in Figs. 10 and 12, and peripherally adjustable in relation to each other by means of the bolts 104, movable in the slots 105, this adjustment permitting a variation of the time required to perform either the in or out movement of the bars 86.

The mechanism for imparting a lengthwise movement to the bars 86—that is, a motion parallel to the front of the machine—comprises the cam 106, which is fixed upon the end of the shaft 65; slide 107, having a slot 108 therein, within which is slidable a block 109, loosely mounted upon the shaft 65; rolls 110, which are mounted upon the slide 107 and lie in the path of the cam 106; link 111, fixed to said slide at one end and adjustably secured at its other end to an arm 112 upon the rock-sleeve 113, having the upwardly-projecting arm 114 integral therewith; shaft 115, fixed within arms upon the bracket 95; a slide 116, mounted in the overhanging portion 117 of the bracket 95 and connected with the arm 114 by the link 118; rolls 119, fixed in the ends of the bars 86 and lying within the recess 120 in the top of the slide 118. The mechanism for adjustably securing the link 111 to the arm 112 comprises a plate 121, removably secured to said arm 112 by the bolts 122 and 123. The rotation of the cam 106 imparts a vertical movement to the slide 107 and through the link 111 a rocking movement to the sleeve 113 and an endwise movement to the slide 116 and bars 86 through the arm 114 and link 118. This endwise movement does not interfere with the in-and-out movement, as the rolls 119 move within the grooves 120 and the springs 91 always exerting a tension to draw the bars 86 together.

The carrier-finger mechanism comprises the saddles 124, having tongues 125 thereon, which lie in the groove 126 in the bars 86 and have a limited endwise adjustment upon said bars; slides 127, which are normally moved in one direction by a spring 128, which abuts at one end against a lip 129 upon said slide; finger-tips 130, secured to said slide; eccentric blocks 131, which are adjustably secured to the slides 127 by the bolt 132. The finger-tips 130 are shaped so as to conform with the contour of the metal at each of its successive operations, and the eccentric roll 131 is adjusted so that the pressure of the spring 128 is just sufficient to hold the metal between the finger-tips 130 while being carried from one punch to another without crushing it.

In operation the metal strip is first placed between the stops 64 upon the guide-bars 63 and then passes through between the rolls 48 and is presented beneath the double-acting plungers. At this time the gates 26 and 27 are actuated through the cam 34, and the blank is pierced from the strip by the action of the piercing-die connected with the gate 26. The drawing-punch 47 is then actuated and the pierced blank is drawn into a shell or cup, after which the piercing and drawing punches are withdrawn, and the knockout-rod lifts the drawn shell from the die. The bars 86 are now moved inwardly and the opposing finger-tips upon the first set of carrier-fingers engage the shell and hold it frictionally therebetween. The endwise movement of the bars 86 now carries this shell parallel to the front of the machine a distance equal to the distance between the plungers 9, and the out movement of the bars 86 releases the hold of the finger-tips upon the shell, and it rests upon the top of the bolster-plate and the bars 86 return to their original positions. At the next rotation of the shaft another blank is cut out and the above operations repeated, except that at the next inward movement of the bars 86 the finger-tips of the second set of fingers engage the first-drawn shell and carry it beneath the first of the single-acting plungers. The first-drawn shell is permitted to rest upon the top of the bolster-plate because the endwise feed of the bars 86 is only equal to the distance between the centers of the single-acting plungers, and as the distance between the center of the double-acting plungers and the first single-acting plunger is equal to twice that of the single-acting plungers the shell must be lifted and carried twice the distance from the double-acting plunger to the first single-acting plunger, after which the feed of the carrying mechanism is just sufficient to carry it from one single-acting plunger to the next one. After the shell has been operated upon by the last single-acting plunger it is permitted to drop from the machine and into a receptacle conveniently arranged to receive it.

There are many minor changes and alterations that can be made within my invention aside from those herein suggested, and I would therefore have it understood that I do not limit myself to the exact construction herein shown and described, but claim all that falls fairly within the spirit and scope of my invention.

Having described my invention, what I claim as new, and desire to secure by Letters Patent, is—

1. In a press; coaxial blanking and drawing punches; a driving-shaft rotatable in a plane different from that of the axes of the aforesaid punches; a cam for positively actuating one of said punches in one direction; and a separate cam for moving the same in the opposite direction.

2. In a press, the combination with coaxial blanking and drawing punches; of a crank-shaft rotatable upon one side of said punches; cams upon said shaft; means for actuating one of said punches from the crank upon said shaft; means connected with one of said cams for moving the other of said punches in one direction; and means connected with the other of said cams for moving said last-mentioned punch in the opposite direction.

3. In a press, the combination with a blanking-punch; of a coaxial drawing-plunger; a rotary crank-shaft; cams fixed thereon; toggles having connection with said drawing-plunger; a pitman having connection with the crank upon said shaft; and a rock-arm, connected with said blanking-punch, having engagement with each of said cams and oscillated in one direction by one of said cams and in the opposite direction by the other of said cams.

4. In a press, the combination with companion gates adjustably connected with each other; of a crank-shaft; cams upon said shaft; a rock-arm actuated by said cams; links connecting one of said gates with said rock-arm; a plunger operative coaxially with said gates; toggles connected with said plunger; and a pitman connected with said shaft and said toggles for actuating said plunger.

5. In a press, the combination with the frame; of a plurality of plungers operative therein; plunger-caps having a recess in one side thereof and a laterally-projecting wing upon the other side.

6. In a press, the combination with the frame; of a plurality of plungers movably mounted therein; means for actuating said plungers; and caps for holding said plungers, said caps having a recess in one side thereof and a laterally-projecting wing upon the other side, said wing being designed to enter the recess in the cap next adjoining.

7. In a press, the combination with the frame; of a plurality of plungers 9 operative therein; caps 11 holding said plungers in position and having recesses 13 in one side thereof and a laterally-projecting wing 14 upon the other side.

8. In a press, the combination with the knockout-rods 76; of the lugs 73 connected with a part upon the frame of the press; knockout-levers 74 having the studs 75 connected therewith and pivotally and separably mounted in said lugs; cams 80; and rolls 79 connected with said knockout-levers between their pivot-mountings and said knockout-rods and engaging said cams.

9. In a press, the combination with the knockout-rods 76; of the removably-secured slotted lugs 73; companion parallel knockout-levers 74 having the rolls 79 therebetween and connected at one end by the studs 75 which are adapted to be pivotally mounted in said lugs 73; and cams 80 having engagement with the rolls 79.

10. In carrying mechanism for a press, the combination with parallel bars; of carrying-fingers connected therewith; crank-plates; means for connecting said crank-plates with said bars; cam mechanism for imparting a partial rotation to said crank-plates, whereby movement is imparted to said bars toward and away from each other; a slide; means for movably securing said bars to said slide; and cam mechanism for imparting movement to said slide and to said bars in the direction of their length.

11. In carrying mechanism, the combination with bars; of carrying-fingers connected therewith; a crank-plate for each of said bars; means for connecting said crank-plates with said bars; means for imparting a partial rotation to said crank-plates, said means comprising a rotary cam, a bell-crank actuated by said cam, a slide actuated by said bell-crank, and a spindle connected with one of said crank-plates and with said slide so that the movement of said slide imparts a partial rotation to said spindle.

12. In carrying mechanism, the combination with the parallel bars 86; of the crank-plates 87 having teeth thereon which intermesh with each other; means for securing said bars to said crank-plates; cam 96 fixed to a rotary part; bell-crank 97 actuated from said cam; a slide 100 actuated by said bell-crank; and a spindle 92 having engagement with one of said crank-plates, whereby movement is imparted to said bars toward and away from each other.

13. In carrying mechanism, the combination with parallel bars 86; of the slide 116; means for movably securing said bars to said slide; a cam 106 connected with a rotary part; and means for imparting movement to said slide from said cam.

14. In carrying mechanism, the combination with the parallel bars; of carrier-fingers connected therewith, said carrier-fingers comprising a saddle connected with said bars, a slide mounted within said saddle, finger-tips connected with said slide, and means for limiting the movement of said slide in one direction.

15. In carrying mechanism, the combination with a bar; of carrying-fingers, comprising a saddle adjustably secured to said bar and having a slide transversely movable therein, spring means for normally moving said slide in one direction, means for limiting the movement of said slide, and finger-tips connected with said slide.

16. In carrying mechanism, the combination with the bars 86; of the saddle 124 adjustably secured thereto; the slide 127 mounted within said saddle; means, as the roll 131, for limiting the movement of said slide in one direction; and finger-tips 130 fixed to said slide.

17. In carrying mechanism, the combination with the bars 86; of carrier-fingers connected therewith, said carrier-fingers comprising a saddle adjustably secured to said bars, a slide 127 movable within said saddle; spring means for normally moving said slide in one direction; finger-tips connected with said slide; and means, as an eccentric roll, adjustably connected with said slide and abutting against said saddle for limiting the movement of said slide in one direction.

18. In feed mechanism for a press, the combination with the driving-shaft; of feed-rolls; cam-actuated means for intermittently rotating said rolls; and means for adjusting said rotating means, whereby the length of feed of said rolls may be varied.

19. In feed mechanism for a press, the combination with the driving-shaft; of feed-rolls; means for intermittently rotating said rolls, said means comprising a cam upon said shaft; a pivotally-mounted part actuated from said cam; and a connection between said part and said rolls.

20. In feed mechanism for a press, the combination with the driving-shaft; of feed-rolls; means for intermittently rotating said rolls, said means comprising a cam upon said shaft; a pivotally-mounted part actuated from said cam, and a connection between said part and said rolls; and means for adjustably securing said connection to said pivotally-mounted part, whereby the length of feed of said rolls may be varied.

21. In feed mechanism for a press, the combination with the driving-shaft; of feed-rolls; a cam upon said driving-shaft; a yoke actuated by said cams; and means for connecting said yoke with said feed-rolls, whereby an intermittent rotary movement is imparted to said feed-rolls.

22. In feed mechanism for a press, the combination with the driving-shaft; of feed-rolls; a cam upon said driving-shaft; a yoke actuated by said cam; means for connecting said yoke with said feed-roll, whereby an intermittent rotary movement is imparted to said feed-rolls; and means for adjustably securing said connecting means to said yoke, whereby the length of feed of said rolls may be varied.

23. In feed mechanism for a press, the combination with the driving-shaft; of feed-rolls; a ratchet-and-pawl mechanism connected therewith; a cam upon said driving-shaft; a pivotally-mounted part actuated from said cam; and a connection between said pivotally-mounted part and said ratchet mechanism.

24. In feed mechanism for a press, the combination with the driving-shaft; of feed-rolls; a ratchet-and-pawl mechanism connected therewith; a cam upon said driving-shaft; a pivotally-mounted part actuated from said cam; a connection between said pivotally-mounted part and said ratchet mechanism; and means for adjustably securing said connection to said pivotally-mounted part, whereby the length of feed of said rolls may be varied.

In testimony whereof I affix my signature in presence of two witnesses.

GEORGE B. LAMB.

Witnesses:
J. M. GALLOND,
M. J. NOONAN.

---

Correction in Letters Patent No. 814,054.

It is hereby certified that the name of the assignee in Letters Patent No. 814,054, granted March 6, 1906, upon the application of George B. Lamb, of Waterbury, Connecticut, for an improvement in "Presses," was erroneously written and printed "The Waterbury Farrel Foundry and Machinery Company," whereas the said name should have been written and printed *The Waterbury Farrel Foundry and Machine Company;* and that the said Letters Patent should be read with this correction therein that the same may conform to the record of the case in the Patent Office.

Signed and sealed this 20th day of March, A. D., 1906.

[SEAL.]

F. I. ALLEN,
*Commissioner of Patents.* bination with the driving-shaft; of feed-rolls; a ratchet-and-pawl mechanism connected therewith; a cam upon said driving-shaft; a pivotally-mounted part actuated from said cam; a connection between said pivotally-mounted part and said ratchet mechanism; and means for adjustably securing said connection to said pivotally-mounted part, whereby the length of feed of said rolls may be varied.

In testimony whereof I affix my signature in presence of two witnesses.

GEORGE B. LAMB.

Witnesses:
J. M. GALLOND,
M. J. NOONAN.

Correction in Letters Patent No. 814,054.

It is hereby certified that the name of the assignee in Letters Patent No. 814,054, granted March 6, 1906, upon the application of George B. Lamb, of Waterbury, Connecticut, for an improvement in "Presses," was erroneously written and printed "The Waterbury Farrel Foundry and Machinery Company," whereas the said name should have been written and printed *The Waterbury Farrel Foundry and Machine Company;* and that the said Letters Patent should be read with this correction therein that the same may conform to the record of the case in the Patent Office Signed and sealed this 20th day of March, A. D., 1906.

[SEAL.]

F. I. ALLEN,
*Commissioner of Patents.*

Correction in Letters Patent No. 814,054.

It is hereby certified that the name of the assignee in Letters Patent No. 814,054, granted March 6, 1906, upon the application of George B. Lamb, of Waterbury, Connecticut, for an improvement in "Presses," was erroneously written and printed "The Waterbury Farrel Foundry and Machinery Company," whereas the said name should have been written and printed *The Waterbury Farrel Foundry and Machine Company;* and that the said Letters Patent should be read with this correction therein that the same may conform to the record of the case in the Patent Office Signed and sealed this 20th day of March, A. D., 1906.

[SEAL.]

F. I. ALLEN,
*Commissioner of Patents.*